US011946702B2

(12) United States Patent
Choi et al.

(10) Patent No.: US 11,946,702 B2
(45) Date of Patent: Apr. 2, 2024

(54) HEAT EXCHANGER CONFIGURATION WITH POROUS LAYER

(71) Applicant: TerraPower, LLC, Bellevue, WA (US)

(72) Inventors: Joon Hyung Choi, Lexington, SC (US); Daniel Eichel, Redmond, WA (US); Mei He, Seattle, WA (US); Pavel Hejzlar, Kirkland, WA (US); Mathieu G. Martin, Kirkland, WA (US); Samuel J. Miller, Kirkland, WA (US); James M. Vollmer, Bothell, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 339 days.

(21) Appl. No.: 17/210,384

(22) Filed: Mar. 23, 2021

(65) Prior Publication Data

US 2022/0310278 A1  Sep. 29, 2022

(51) Int. Cl.
*F28F 13/00* (2006.01)
*F28D 21/00* (2006.01)

(52) U.S. Cl.
CPC .... *F28F 13/003* (2013.01); *F28D 2021/0054* (2013.01)

(58) Field of Classification Search
CPC ...... F28F 13/003; F28F 3/005; F28F 2270/00; F28F 3/048; F28D 2021/0054; F28D 7/103; F28D 7/106; F28D 3/048; F28D 9/0037; G21D 1/006
USPC ................................................ 165/134, 136
See application file for complete search history.

(56) References Cited

U.S. PATENT DOCUMENTS

| 3,595,310 A * | 7/1971 | Burne ................... F28F 13/003 165/181 |
| 4,972,902 A | 11/1990 | Ninomiya |
| 8,800,641 B2 * | 8/2014 | Jacobsen ............... F28F 13/003 165/169 |
| 11,129,297 B2 * | 9/2021 | Chan .................. H05K 7/20509 |

(Continued)

FOREIGN PATENT DOCUMENTS

| JP | H09119791 A | 5/1997 |
| WO | 2014039641 A2 | 3/2014 |

OTHER PUBLICATIONS

Aritomi et al., "Fundamental Study on Duplex Steam Generator Tubes for Liquid-Metal-Cooled Fast Reactors", Nuclear Technology, Feb. 1995, pp. 246-254, vol. 109, No. 2.

(Continued)

*Primary Examiner* — Tho V Duong
(74) *Attorney, Agent, or Firm* — FisherBroyles, LLP; Jeremy P. Sanders

(57) ABSTRACT

A nuclear reactor includes a heat exchanger that transfers thermal energy from a primary reactor coolant to a secondary coolant. The heat exchanger is formed with a hot flow channel, a cold flow channel, and a porous layer between the hot flow channel and the cold flow channel. The porous layer may be thermally insulative to reduce the efficiency of thermal energy transfer from the hot flow channel to the cold flow channel. The porous layer may have a control gas passed therethrough that can be tailored to control the thermal energy transfer through the porous layer. The control gas can be tested for leakage within the heat exchanger. The control gas may also be used to sequester fission or activation products.

11 Claims, 7 Drawing Sheets

(56) References Cited

U.S. PATENT DOCUMENTS

| | | | | |
|---|---|---|---|---|
| 2008/0078532 A1* | 4/2008 | Nagashima | ........... | F28F 13/003 |
| | | | | 165/104.34 |
| 2008/0105402 A1* | 5/2008 | Behrens | ................... | F28F 3/12 |
| | | | | 165/41 |
| 2015/0308755 A1* | 10/2015 | Rasmussen | ............... | F28F 1/10 |
| | | | | 165/135 |
| 2016/0102927 A1* | 4/2016 | Bunger | ................... | F16L 59/02 |
| | | | | 165/53 |
| 2018/0073811 A1* | 3/2018 | Taras | ..................... | F28F 1/003 |

OTHER PUBLICATIONS

Hooman et al., "Metal foam heat exchanger for dry cooling", Final Report for ANLEC Project 5-0710-0063, Nov. 2013, 26 pages.

Rydalina et al., "Analysis of the Efficiency of Using Heat Exchangers with Porous Inserts in Heat and Gas Supply Systems", Energies, 2020, pp. 1-13, 5854.

International Application No. PCT/US2021/023771 ISR and WO dated Nov. 29, 2021, 14 pages.

* cited by examiner

HEAT EXCHANGER CONFIGURATION WITH POROUS LAYER

BACKGROUND

A heat exchanger is a device that allows thermal energy transfer from a reactor core of an operating nuclear reactor to a secondary fluid where the thermal energy is taken and used for a useful purpose. In some cases, the thermal energy is used for steam generation, which is used for power generation, such as through a steam turbine.

In many cases, heat exchangers are subject to a large temperature gradient which can cause thermal stresses to the components of the heat exchanger. In cases where the temperature gradient is sufficiently high, thermal stresses can cause leaks which facilitate mixing of the two working fluids. In some cases, the two working fluids passing through the heat exchanger may exhibit unfavorable reactions if allowed to mix.

Furthermore, in some cases if a working fluid passing through the heat exchanger achieves a temperature below a freezing temperature of the working fluid, it may begin to solidify and decrease the effectiveness of the heat exchanger in transferring thermal energy.

It would be an advantage if the aforementioned problems were addressed, such as by further increasing strength to withstand cyclical thermal stresses of a heat exchanger, inhibiting leakage and mixing of two or more working fluids, and inhibiting the working fluids from freezing.

These, and other advantages, will become apparent by reference to the following description and appended figures.

SUMMARY

According to some embodiments, a heat exchanger is described that may be used in a nuclear reactor. The heat exchanger includes a hot flow channel; a cold flow channel fluidically separated from the hot flow channel; and a porous thermally insulative layer disposed between the hot flow channel and the cold flow channel. The porous thermally insulative layer may include an inlet; an outlet; and a fluid pathway between the inlet and the outlet; and wherein the porous thermally insulative layer is configured to flow a control gas through the fluid pathway, the control gas configured to influence a thermal energy transfer efficiency of the porous thermally insulative layer.

In some cases, the control gas is used for leak detection of a first fluid, a second fluid, or both. In other words, if there is a breach in the hot flow channel or the cold flow channel, the control gas may be monitored for the presence of a fluid in an exit stream of the control gas. In some cases, the control gas is used to capture a fission product or an activation product, such as, for example, tritium.

The control gas may be a mixture of two or more gases and a mixing control may be provided to change the mixture of the two or more gases to vary the thermal energy transfer efficiency of the porous thermally insulative layer. In some instances, the control gas is a mixture of argon and helium. The mixing control can be used to vary the percentage of the argon and helium within the control gas, which also changes the thermal conductivity properties of the control gas.

In some embodiments, the porous thermally insulative layer is formed of a metal or metal alloy and defines an open pore structure. It may alternatively be formed of a ceramic material. The porous thermally insulative layer may be formed through an additive manufacturing process. The additive manufacturing process may include 3D printing or molding.

In some cases, the porous thermally insulative layer reduces a thermal energy transfer efficiency from the hot flow channel to the cold flow channel.

The heat exchanger may be a plate heat exchanger comprising a hot plate and a cold plate and wherein the hot flow channel is formed as first guide channels in a surface of the hot plate and wherein the cold flow channel is formed as second guide channels in a surface of the cold plate. In other cases, the heat exchanger may be a shell and tube heat exchanger.

In the case of a plate heat exchanger, the porous thermally insulative layer may be disposed between the hot plate and the cold plate. The porous thermally insulative layer may provide an additional boundary to inhibit mixing of the hot fluid and the cold fluid.

For example, the porous thermally insulative layer may further decouple the hot flow channel and the cold flow channel and allows the hot flow channel and cold flow channel to react independently to a thermal gradient placed across the heat exchanger.

According to some embodiments, a method for reducing thermal energy transfer efficiency in a heat exchanger includes providing a hot flow channel; providing a cold flow channel fluidically decoupled from the hot flow channel; and providing a porous thermally insulative layer in between the hot flow channel and the cold flow channel.

Providing the porous thermally insulative layer may include providing a metallic open pore structure between the hot flow channel and the cold flow channel. The method may further include providing an inlet to one side of the porous thermally insulative layer and providing an outlet to another side of the porous thermally insulative layer.

A control gas may be introduced from the inlet, through the porous thermally insulative layer, and through the outlet.

In some cases, the method includes controlling a thermal energy transfer efficiency of the heat exchanger by varying a mixture of the control gas. For example, the control gas may be a mixture of two or more gases, and by varying the mixture of the control gas, the thermal energy transfer efficiency of the heat exchanger can be modified. In some cases, the control gas is a mixture of argon and helium, although any suitable gas or mixture of gases may be used.

In some example, the control gas may be tested for the presence of a leaking material within the heat exchanger. The leaking material may be a first fluid, a second fluid, or both. The method may also include selecting a control gas to attract and capture tritium. The control gas can be captured after flowing through the heat exchanger and tritium may be removed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
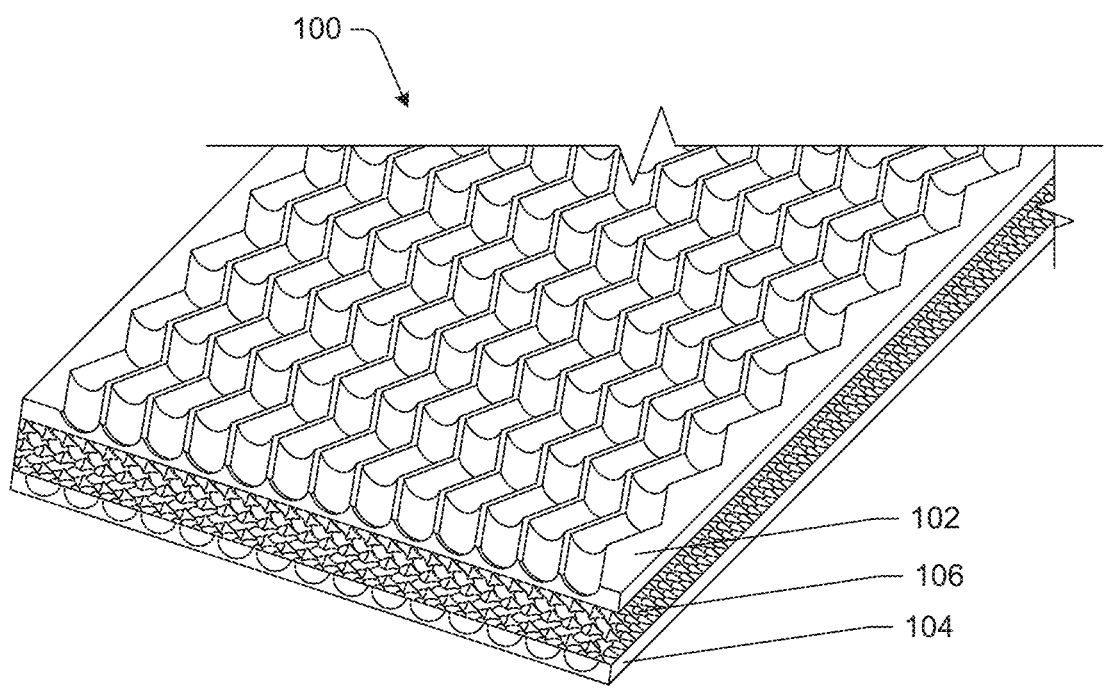
FIG. 1A is a schematic representation of a plate heat exchanger for transferring thermal energy from a hot fluid to a cold fluid, in accordance with some embodiments.
Figure 1B:
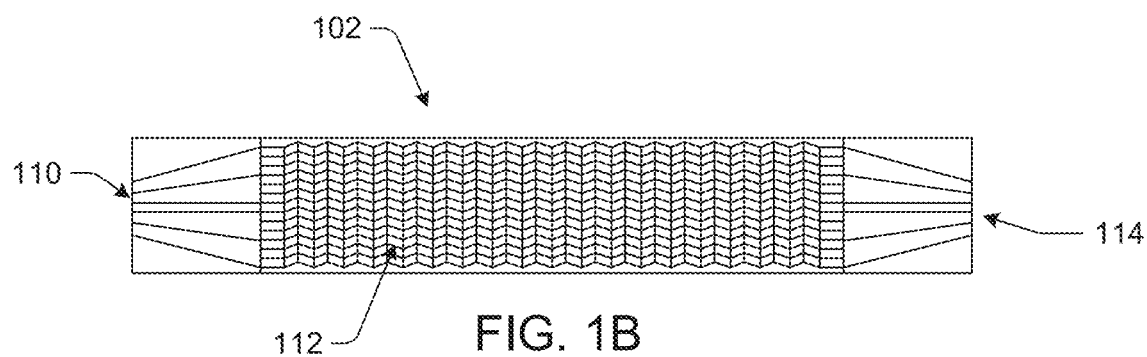
FIG. 1B is a schematic representation of a hot flow plate with flow channels, in accordance with some embodiments.
Figure 1C:
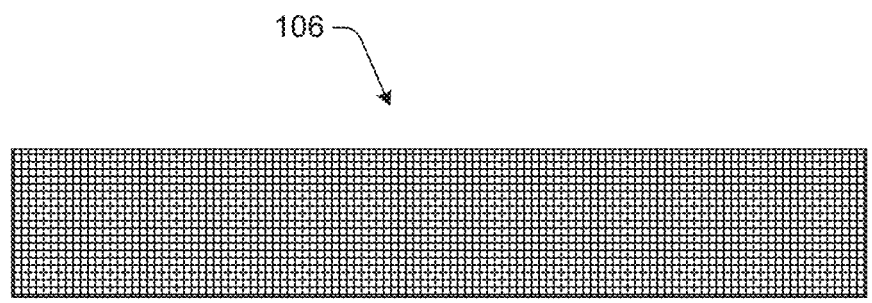
FIG. 1C is a schematic representation of a porous layer that may be disposed between hot flow plates and cold flow plates within a plate heat exchanger, in accordance with some embodiments.

This disclosure generally relates to heat exchanger apparatuses. The heat exchangers can be used in any application in which thermal energy transfer between a first fluid and a second fluid is desired. While much of the following disclosure is provided in the context of a nuclear reactor, it should be understood that nearly any application that utilizes a heat exchanger may benefit from the embodiments described and claimed herein. It also relates to a configuration that can reduce the efficiency of the heat exchanger and thereby attenuate the thermal stresses and temperature gradients across the heat exchanger. While there has been a significant amount of work done to improve the efficiency of heat exchangers, even using foamed materials to increase the surface area and promote conduction, according to some embodiments, a layer of porous material is situated between hot and cold flow paths to reduce the heat transfer, thereby reducing the thermal energy transfer efficiency of the heat exchanger. Providing a porous layer has the further benefit of providing flexibility in the heat exchanger to better absorb the thermal stresses imparted to the heat exchanger, which can serve to cause failure of one or more components and allow mixing of the working fluids.

In some cases, the working fluids within the heat exchanger are different fluids and may include a salt and sodium. For example, in a molten salt reactor (MSR), a fuel salt provides both the fuel and the primary coolant for the reactor core. In some cases, the fuel salt is a first working fluid and a secondary coolant receives thermal energy from the fuel salt. The secondary coolant may be any suitable coolant, such as, for example, salt, sodium, or some other desired coolant.

In some nuclear reactors, sodium is a primary coolant within the reactor and receives thermal energy from the reactor core. Sodium may enter the heat exchanger as a first working fluid and deliver thermal energy to a second working fluid, which may be sodium, salt, or some other suitable coolant.

As used herein, the term "primary coolant" is a broad term and refers to a fluid that receives thermal energy from a reactor core to manage the core temperature. A primary coolant may be any suitable coolant, such as, for example, salt, sodium, lead, lead-bismuth eutectic, heavy water, light water, gas, or some other suitable coolant. The primary coolant within the reactor vessel is also referred to herein as a first working fluid within the heat exchanger. While exemplary embodiments refer to a single heat exchanger as an example, it should be understood and appreciated that nuclear reactors may contain any number of heat exchangers that function to transfer thermal energy from the primary coolant to a secondary coolant. Moreover, a heat exchanger may be made of several heat exchanger cores that all cooperate to handle the heat load of the reactor. While any of these configurations are equally applicable to the disclosure herein, for efficiency, a single heat exchanger will be used in describing example embodiments. Throughout this description, reference is also made to a first fluid and/or a second fluid within a heat exchanger. It should be understood that the terms "first fluid" and "second fluid" may be used interchangeably with the terms "primary coolant" and "secondary coolant."

In some embodiments a compact heat exchanger is provided within a reactor vessel of a nuclear reactor and transfers heat from a primary coolant in the reactor core to a secondary coolant. In some cases, the heat exchanger transfers thermal energy from sodium to salt. For example, in a sodium-cooled fast reactor ("SFR"), sodium may be used as the primary coolant within the reactor vessel. As the sodium circulates throughout the reactor vessel either through natural circulation, one or more circulation pumps, or a combination of circulation modalities, the sodium in closer proximity to a region of high reactivity will receive thermal energy and become heated. The heated sodium may be caused to flow through a heat exchanger, where the thermal energy is transferred from the primary sodium coolant to a secondary coolant, which in some cases is sodium, salt, or some other secondary coolant.

In a molten salt reactor (MSR), a fuel salt may be used as both a fuel and as a primary coolant circulating through the reactor vessel through natural circulation, by one or more pumps, or a combination. The fuel salt may pass through the core, where it becomes heated as it receives thermal energy from the fission reaction. The fuel salt may be sent to a heat exchanger, where it transfers thermal energy to a secondary coolant, which may be salt, sodium, or some other coolant fluid circulating through the heat exchanger. In some cases, the secondary coolant may have a higher thermal conductivity than the fuel salt. As an example, sodium has about a 100× higher thermal conductivity than many coolant salts. In a salt to sodium heat exchanger, it is desirable to control the transfer of thermal energy from the salt to the sodium. For instance, if the thermal transfer is too efficient, the fuel salt may cool below its freezing point and begin to increase in viscosity and/or have a reduced flow through the heat exchanger which may exacerbate the problem of the fuel salt freezing within the heat exchanger. Of course, if the primary coolant stops flowing through the heat exchanger, this can lead to other undesirable issues, such as heat build-up within the reactor vessel, among other things.

Accordingly, in some examples, it may be important to control, limit, slow, or otherwise influence the transfer of thermal energy in the heat exchanger from the primary coolant to the secondary coolant.

A plate heat exchanger may be used to transfer thermal energy from the primary coolant to the secondary coolant. In some cases, a plate heat exchanger may have two inlets and two outlets. For example, a plate heat exchanger may have an inlet and an outlet for the primary coolant and an inlet and outlet for the secondary coolant. The flow paths for these liquids may be defined by channels within respective plates of the heat exchanger and the plates keep the coolants fluidically separated, and in thermal communication as the plates conduct thermal energy from the hot fluid to the cold fluid.

In some instances, it is desirable to maintain separation between the primary coolant and the secondary coolant. For example, in some cases, the primary coolant and secondary coolant may react if combined. A plate heat exchanger typically provides separation between the primary coolant flow path and the secondary coolant flow path. However, due to the cyclic thermal stresses applied to the heat exchanger, it may be possible for the separation between the plates to fail, such as through plastic deformation that allows mixing of the primary and secondary coolant. In many plate heat exchangers, a hot fluid channel is formed on one surface of a plate, and a cold fluid channel is formed on the opposing side of the plate. Consequently, the thickness of the plate provides the segregation between the hot fluid and the cold fluid. If one or more plates were to fail, then the fluids would be able to mix.

Accordingly, it is desirable to further inhibit the mixing of coolants, such as by reducing the thermal stresses applied to the heat exchanger, providing further separation between the fluid flow paths, and/or allowing elastic deformation within the heat exchanger to compensate for the cyclical thermal stresses. According to some embodiments, all of these advantages are provided by forming a porous layer in between the hot fluid channel and the cold fluid channel.

FIG. 1A-1D illustrate layers of a plate heat exchanger 100. According to some embodiments, a plate heat exchanger is formed of a plurality of metal plates that are bonded together. Fluid pathways are formed into the surface of the plates to form fluid flow pathways for a hot fluid and a cold fluid. A hot flow plate 102 and a cold flow plate 104 are typically in thermal communication, such as by conduction, and thermal energy is transferred from the hot flow plate 102 to the cold flow plate 104. In many cases, the hot flow plate 102 and the cold flow plate 104 are bonded directly together, while in other cases, a single plate has channels formed on both surfaces of the plate and has one surface part of the hot flow path and the opposing surface forms part of the cold flow path.

One potential concern with this arrangement is that cyclical thermal stresses can cause weakening and eventual failure of one or more plates and allow mixing of the primary coolant and secondary coolant. Therefore, in some embodiments, a porous layer 106 is disposed in between the hot flow plate 102 and the cold flow plate 104. This provides separation between the hot flow plate 102 and the cold flow plate 104, which provides an additional barrier to mixing of the primary coolant and secondary coolant. For instance, in order for the primary coolant and secondary coolant to mix, there must be a concurrent failure of both of the hot flow plate 102 and an adjacent cold flow plate 104.

The porous layer 106 may be any suitable porous material, but in some cases, is a porous metal. The porous layer 106 may be formed through any suitable process and of any suitable materials. For example, the porous layer 106 may be formed through one or more of additive manufacturing process (e.g., 3D printing), sintering, spraying, foaming, powder metallurgy or injection molding to name a few. In some cases, the porous layer 106 forms an open pore structure in which pores are interconnected to form fluid pathways therebetween. In some cases, the porous layer 106 forms a third fluid pathway having a third fluid inlet and a third fluid outlet for passing a third fluid through the porous layer 106 of the heat exchanger 100.

The porous layer 106 may be formed to have any pattern, such as a regular pattern that may be formed through additive manufacturing or molding. The porous layer 106 may additionally or alternatively be formed with a random pattern such as through sintering, spraying, powder metallurgy, foaming, or other suitable process.

In some cases, a third inlet and outlet may be provided, and a third fluid flow path is defined by the porous layer 106. A third fluid may be provided for any of a number of purposes, for example, to detect leaks in the heat exchanger of either the primary coolant or the secondary coolant, for removing fission products or activation products (e.g., tritium), for altering the thermal transfer properties of the heat exchanger, or some other purpose. In some cases, hydrogen may be used as a third fluid within the heat exchanger. In some cases, $CO_2$ may be used as a third fluid within the heat exchanger. In some cases, helium may be used as the third fluid within the heat exchangers. In some cases, argon may be used as the third fluid within the heat exchanger. In some cases, a mixture of gases is provided through the porous layer of the heat exchanger.

In any case, the third fluid may be used for leak detection. For example, one or more detectors may be placed on the third fluid stream that is downstream of the heat exchanger and the third fluid may be tested for the inclusion of one or more substances that were not present in the third fluid before it entered the heat exchanger. For example, the third fluid can be tested for salt after it passes through the heat exchanger, and the presence of salt in the third fluid (whether in liquid or vapor form) may be an indication of a salt leak within the heat exchanger.

The hot flow plate 102 and the cold flow plate 104 may have fluid flow channels formed therein, which may be machined, chemically etched, laser etched, or formed through some other suitable process. The plates may provide thermal communication between the primary coolant and secondary coolant, such as through material conduction. In some cases, the plates may be fused together to form a monolithic structure. As illustrated, a primary reactor coolant enters the heat exchanger from an inlet 110, where it flows through the channels 112 in the plates, and exits an opposing side of the heat exchanger at an outlet 114.

Figure 1D:
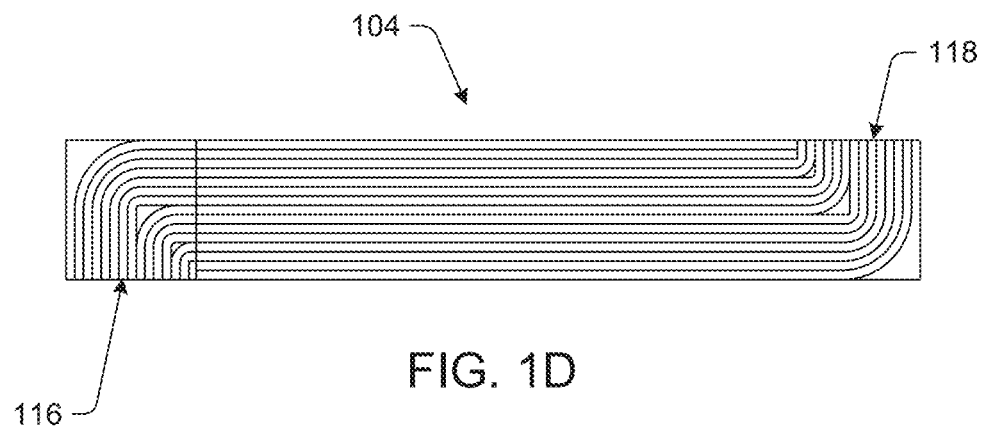
FIG. 1D is a schematic representation of a cold flow plate with flow channels, in accordance with some embodiments.

FIG. 1D illustrates a cold flow plate 104 having a second inlet 116 for a secondary coolant fluid. A secondary coolant fluid outlet 118 allows the secondary coolant to exit the heat exchanger 100. In some cases, the secondary coolant loop includes a coaxial pipe in which an inner pipe extends through an outer pipe. The inner pipe may be coupled to the inlet of the heat exchanger and the outer pipe may be coupled to an outlet of the heat exchanger, in which case the inlet and outlet of the cold plate 104 may be formed on a same side of the heat exchanger.

Suitable heat exchangers 100 include, without limitation, a printed circuit heat exchanger, a plate heat exchanger, a formed plate heat exchanger, or a hybrid heat exchanger, in which two or more media flow on opposite sides of one or more bonded plates. The cooling media may be under high pressure, but in some embodiments, is at low pressure. The working fluids, which in some embodiments are salt and sodium, may be caused to flow on both sides of the one or more bonded plates through 2D or 3D plate patterns. The 2D or 3D plate patterns can be configured to produce the desired thermal length and pressure drop.

The nuclear reactor can be any suitable nuclear reactor to take advantage of the improvements possible by the embodiments described herein. For example, and without limitation, the described embodiments can be used with an SFR, an MSR, or any other reactor, and the reactors may be pool-type or loop-type reactors. Of course, other types of reactors may be used, and any suitable primary and secondary coolants may be used. In some cases, the described heat exchanger is a salt/sodium heat exchanger where salt is the primary coolant and sodium is the secondary coolant. In other cases, the heat exchanger is a salt/salt heat exchanger, a sodium/salt heat exchanger a sodium/sodium heat exchanger, a salt/lead heat exchanger, a lead/salt heat exchanger, a sodium/water heat exchanger, a salt/lead-bismuth eutectic heat exchanger or a lead-bismuth eutectic to salt heat exchanger. Of course, any two working fluids may be used in a heat exchanger according to embodiments and the working fluids may be the same or different fluids.

The heat exchanger 100 may be formed of a series of parallel plates 102, 104 having surface grooves 112 that are placed adjacent one another so as to form a series of channels when the plates 102 are bonded together. The surface grooves 112 may be photochemically etched, mechanically formed, or formed through some other process, into the surface of the plate and sized and arranged to provide the desired flow characteristics such as fluid path length and pressure drop.

In many cases, the plates 102, 104 are diffusion bonded to one another, which is a solid-state welding process that returns the bonds to the parent metal strength, permits excellent thermal-hydraulic performance, and allows for design optimization of 2D and/or 3D fluid pathways through the heat exchanger 100. However, in some cases, a porous layer 106 is provided in between each of the hot flow plate and cold flow plates.

In some embodiments, a header or manifold (not shown) may be attached to the fluid inlet 110 or outlet 114 that provides a fluid communication path through all the layers of the heat exchanger 100 simultaneously. Alternatively, or in addition, ports can be configured during the plate formation stage to provide integral headers in the heat exchanger 100. In some cases, a heat exchanger 100 may be semi-ported with a mixture of headers and ports that are connected by manifolds.

An allowable pressure drop can be specified, and lower pressure drops are typically desirable to reduce capital cost and operating cost. In some embodiments, the pressure drop across the primary coolant flow path of the heat exchanger 100 is less than about 6 psi, or less than about 5 psi, or less than about 4 psi, or less than about 3 psi. A lower pressure drop may typically require a short flow length and a low viscosity of the coolant, which directly impacts that heat transfer coefficient. The pressure drop can be tuned by varying the flow length, the fluid viscosity, and/or the dimensions of the flow path width and depth, and overall heat transfer can likewise be affected by varying the number of layers and the heat transfer area.

The plate surface types can be tailored for the specific purpose and may be formed to enhance surface density and heat transfer coefficients and may be formed as fins having any suitable arrangement, such as serrated, herringbone, or perforated. Of course, other arrangements are possible and contemplated herein. In combination, or in the alternative, passageways may be created directly in the plates through any suitable manner, and in some cases, are formed by photochemical etching.

The passageways may be any suitable size and cross-sectional shape. In some embodiments, the formed channels are semi-circular with a radius of about 0.5 mm, or about 0.75 mm, or about 1 mm. Of course, other suitable cross-sectional shapes and sizes are contemplated in accordance with design flow parameters of the heat exchanger.

Figure 2:
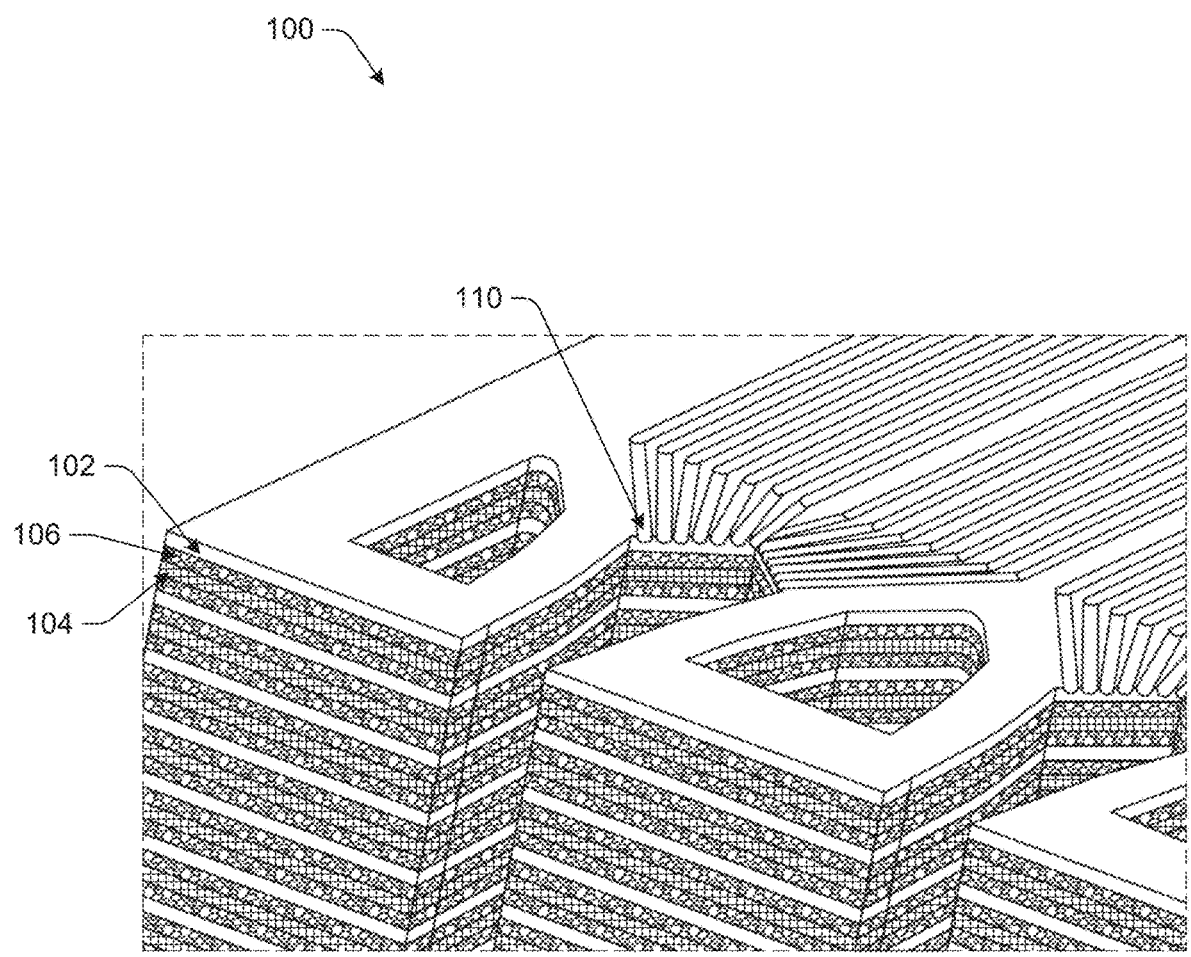
FIG. 2 illustrates a schematic representation of a plate heat exchanger with porous layers between hot flow plates and cold flow plates, in accordance with some embodiments.

FIG. 2 illustrates a heat exchanger 100 formed by bonding together alternating hot flow plates 102, cold flow plates 104, and porous layers 106. As shown, the porous layers 106 create a separation between the hot flow plates 102 and the cold flow plates 104. As such, the failure of a single plate may not result in mixing of the primary coolant and the secondary coolant, but rather, allows a leaking fluid to enter the space created by the porous layer 106.

Additionally, in some cases, the porous layer 106 may contain a control gas. The control gas may be any suitable gas or mixture of gases. In some cases, the control gas is a mixture of inert gases such as argon or nitrogen, for example. The mixture percentage of the control gas may be varied, such as to control the heat transfer coefficient in the porous layer, which allows fine tuning of the efficiency of the heat transfer between the primary coolant and the secondary coolant.

For example, in some cases, the control gas is a mixture of argon and helium, and the mixture may be controlled to influence the effective conductivity of the porous layer. The thermal energy transfer to the gas may be relatively low in comparison to conduction through the porous layer; however, by varying the mixture of the control gas, it is possible to actively control the thermal energy transfer efficiency through the porous layer. Using a mixture of argon and helium as an example, suitable mixtures may be between 100% argon and 100% helium, or any mixture percentage in between. In some cases, the mixture may be about 50% argon and 50% helium. In general, helium is much more thermally conductive than argon, which then follows that a control gas having a higher percentage of helium will provide improved thermal transfer properties, and a lower percentage of helium will provide decreased thermal transfer properties. The control gas may be any suitable gas mixture, and may include any of a number of gases, such as nitrogen, argon, helium, $CO_2$, or other inert gases. According to laboratory testing conducted, it was observed that the thermal transfer could be influenced by up to 10% or more by varying the control gas mixture within the porous layer 106. Depending on the control gas used within the porous layer 106, the thermal energy transfer efficiency between the hot flow plate 102 and the cold flow plate 104 may be reduced by 10% or more.

The porous layer provides a gas separation between the hot flow plate 102 and the cold flow plate 104 which reduces the thermal transfer efficiency compared with bonding the hot flow plate 102 directly to the cold flow plate 104. In other words, the porous layer 106 creates a thermal insulator between the hot flow plate 102 and the cold flow plate 104, thereby reducing thermal energy transfer efficiency.

Moreover, the control gas can be monitored to test for failure of one or more hot flow plates 102 or cold flow plates 104. For example, the control gas can be monitored for leakage of the primary coolant or the secondary coolant. As the control gas exits the heat exchanger, it can be tested for the presence of the primary coolant, secondary coolant, or both in order to determine if there has been a failure within the heat exchanger. As described, the mixing of primary and secondary coolants is inhibited by the porous layer providing an additional boundary between the primary coolant and the secondary coolant.

The thermal stresses exhibited by the heat exchanger are in direct proportion to the thermal gradient between the hot flow plate 102 and the cold flow plate 104 and the efficiency of the thermal transfer. In some cases, the thermal stresses can be severe and cause thermal expansion and contraction of different portions of the heat exchanger as it experiences a temperature gradient. In many typical heat exchangers, the components are rigidly coupled, and thermal stresses can lead to thermal fatigue cracking and catastrophic failure. The mechanical properties of the heat exchanger materials deteriorate with time when the materials are exposed above a certain temperature. Similarly, the ultimate strength of the materials decreases due to material aging at high temperatures. This exacerbates the occurrence of plastic deformation in thermal fatigue.

The porous layer 106 provides the additional benefit of allowing relative movement between the hot flow plate 102 and the cold flow plate 104 due to thermal stress. The porous layer 106 provides compliance to allow the hot flow plate 102 to largely deform independently of the cold flow plate 104. In other words, the porous layer 106 is a cushion to absorb excessive stresses experienced by the heat exchanger 100. Through experimentation, it has been observed that the porous layer allows individual pores to elastically collapse to absorb the thermal stress and strain. In some cases, the porous layer 106 provides sufficient flexibility to allow the hot flow plate 102 and the cold flow plate 104 to expand and contract independently. This allows, among other things, the hot flow plate 102 and the cold flow plate 104 to be formed of different materials, if desired. In some cases, the hot flow plate 102 is formed of a first material and the cold flow plate 104 is formed of a second material different than the first material. In some cases, the second material has a different coefficient of thermal expansion than the first material. In some cases, the second material has a higher coefficient of thermal expansion than the first material.

Figure 3A:
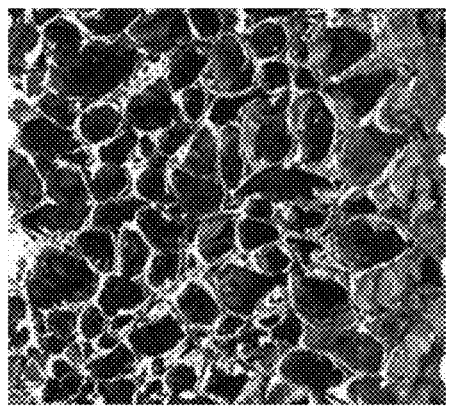
FIG. 3A illustrates an example porous layer that can be used within a heat exchanger, in accordance with some embodiments.
Figure 3B:
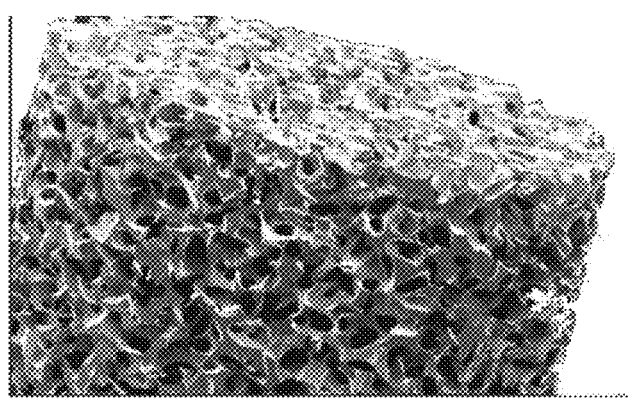
FIG. 3B illustrates an example porous layer that can be used within a heat exchanger, in accordance with some embodiments.

FIGS. 3A-3D are examples of porous layers 106 that may be used with embodiments described herein. FIGS. 3A and 3B illustrate a porous layer 106 with a random pore structure. A random pore structure may be formed through any suitable technique, such as by foaming, sintering, powder metallurgy, spraying, or other suitable process. The porous layer 106 may be formed of any suitable material, and in some cases, is formed of a metal or a ceramic, or a combination. In some cases, the porous layer is formed of a nickel-based alloy or steel.

Figure 3C:
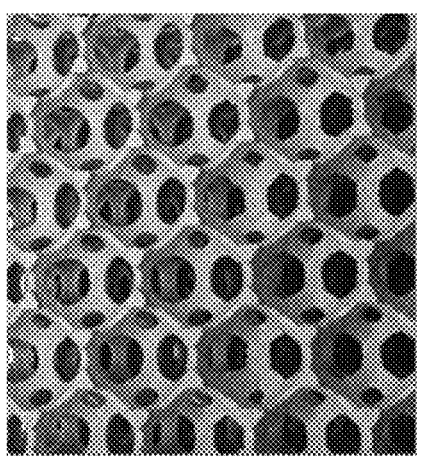
FIG. 3C illustrates an example porous layer that can be used within a heat exchanger, in accordance with some embodiments.
Figure 3D:
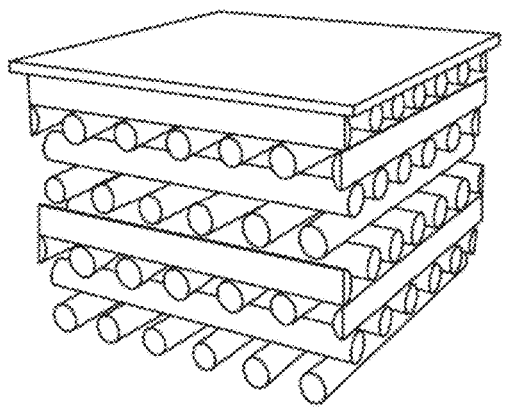
FIG. 3D illustrates an example porous layer that can be used within a heat exchanger, in accordance with some embodiments.

FIGS. 3C and 3D illustrate a porous layer 106 having uniform pore distribution. A uniform pore distribution may be provided through any suitable process, such as a material removal, or material additive manufacturing techniques. Exemplary manufacturing techniques include 3D printing, fusion bonding metallic powders, electron beam melting, injection molding, as well as other suitable techniques.

With any of the embodiments described herein, the porous layer may be formed according to design criteria, such as pressure drop, density, crush strength or other characteristics. In some cases, the degree of porosity is controlled to result in an open pore structure in which adjacent pores are interconnected to provide a fluid pathway through the porous layer. In some cases, the porous layer 106 is up to 95% porous, or up to 85% porous, or up to about 75% porous, or up to about 70% porous, or up to about 60% porous, or up to about 50% porous, or up to about 40% porous. In some cases, the porosity of the porous layer 106 is within the range of from about 40% porous to about 70% porous. In some cases, the degree of porosity is balanced against the resulting crush strength of the porous layer 106. In addition, the greater the degree of porosity, the less thermal conduction will occur through the porous layer 106, and the choice of control gas may have a greater effect on the overall thermal transfer efficiency through the porous layer 106.

In some embodiments, the porous layer 106 is in fluid communication with an inlet manifold or plenum that provides the control gas to an inlet on one side of the porous layer. An outlet may be formed on an opposing side of the porous layer 106, which may be an outlet manifold or plenum. Providing an inlet and outlet to the porous layer defines a flow direction, and as with any of the embodiments described herein, the control gas may be passed through the porous layer 106 and used for leak detection. In addition, the porous layer further segregates the primary coolant from the secondary coolant. As the control gas exits the heat exchanger, it can be tested for inclusion of the primary coolant and/or secondary coolant materials. For instance, helium can be passed through the porous layer and tested for the presence of the primary coolant and/or secondary coolant upon its exit.

In some cases, the control gas may be selected and used to capture fission products or activation products. For example, the control gas may be used to capture and remove products, such as tritium for example, from the heat exchanger before it migrates from the primary coolant to the secondary coolant.

It should be appreciated that the control gas may be varied over time. For example, the mixture of two gases may be varied to control the thermal energy transfer efficiency of the porous layer 106 and the percentage mixture may be changed from time to time. Additionally, a first control gas may be purged by injecting a second control gas, and the second control gas may be different than the first control gas. In other words, a first control gas may be introduced at a first time, and a second control gas may be introduced at a second time later than the first time.

In some embodiments, the porous layer is not a continuous shape, but rather, may be formed by discrete particles that define flow paths between the particles. As an example, a porous layer may be formed by aggregating pebble materials, powder, or spherical particles in between the hot flow plate 102 and the cold flow plate 104 to provide many of the advantages and benefits described herein.

In some cases, the porous layer 106 may not be bonded to the hot flow plate 102 and/or the cold flow plate 104. For example, the hot flow plate 102 and the cold flow plate 104 may be bonded to a heat exchanger shell to define a space between the hot flow plates 102 and the cold flow plates 104, and the spaces therebetween may be filled with the porous layer material, which may be powder, pebbles, or particles with some other suitable morphology that provides an open pore structure to provide a flow path through the porous layer 106.

Figure 4:
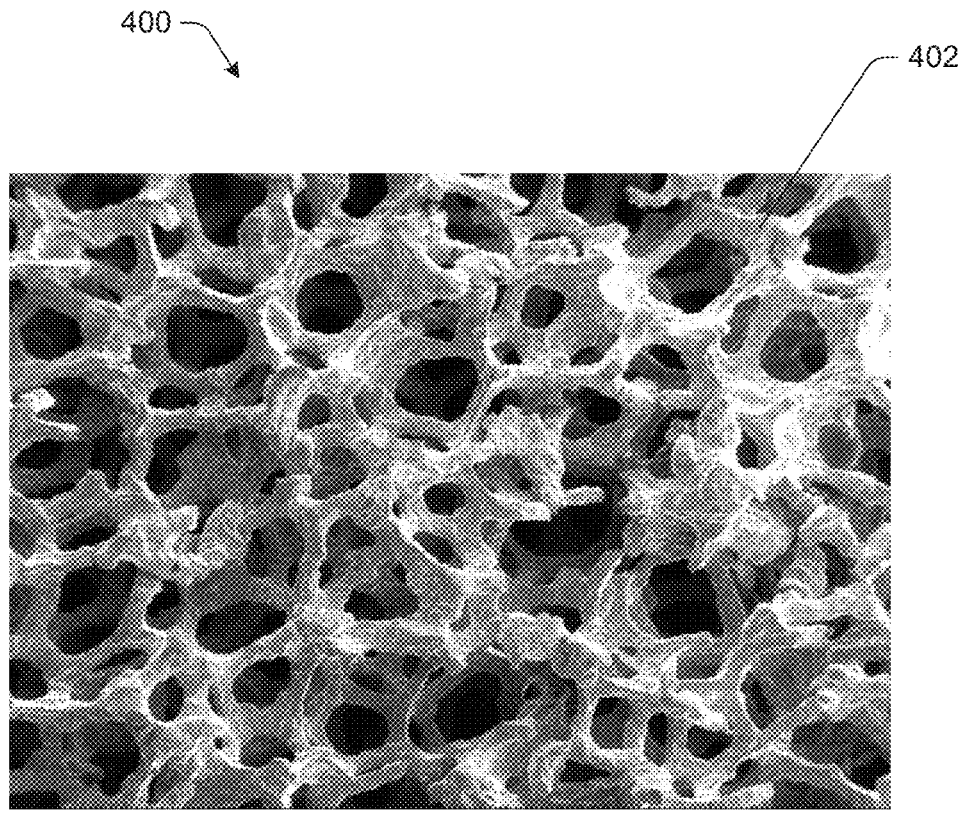
FIG. 4 illustrates a scanning electron image of a porous structure that can be used as a layer within a heat exchanger, in accordance with some embodiments.

FIG. 4 illustrates a close-up view of an open pore structure formed in a metallic porous layer 400. The metallic porous layer 400 may be used with any embodiment described herein to provide the benefits and advantages described. In some examples, the metallic porous layer 400 is formed of a suitable metal and is formed with an open pore structure that may be between about 30% and 80% porous, or 40% and 70% porous, or 50%-60% porous.

In some cases, the porous layer 400 is comprised of metal ligaments 402 that form a porous structure. The metal ligaments 402 may offer resiliency to accommodate differential thermal expansion and contraction between the hot flow plate and the cold flow plate. The metal ligaments 402 may provide sufficient crush strength to maintain the size and shape of the porous metal layer 400. The metal ligaments may be formed of any suitable material, which may be different than the material that the heat exchanger is made of. The metal ligaments 402 may be formed through any suitable process, such as, for example, drawing, spinning, foaming, printing, sintering, bubbling, or any other suitable process.

Figure 5:
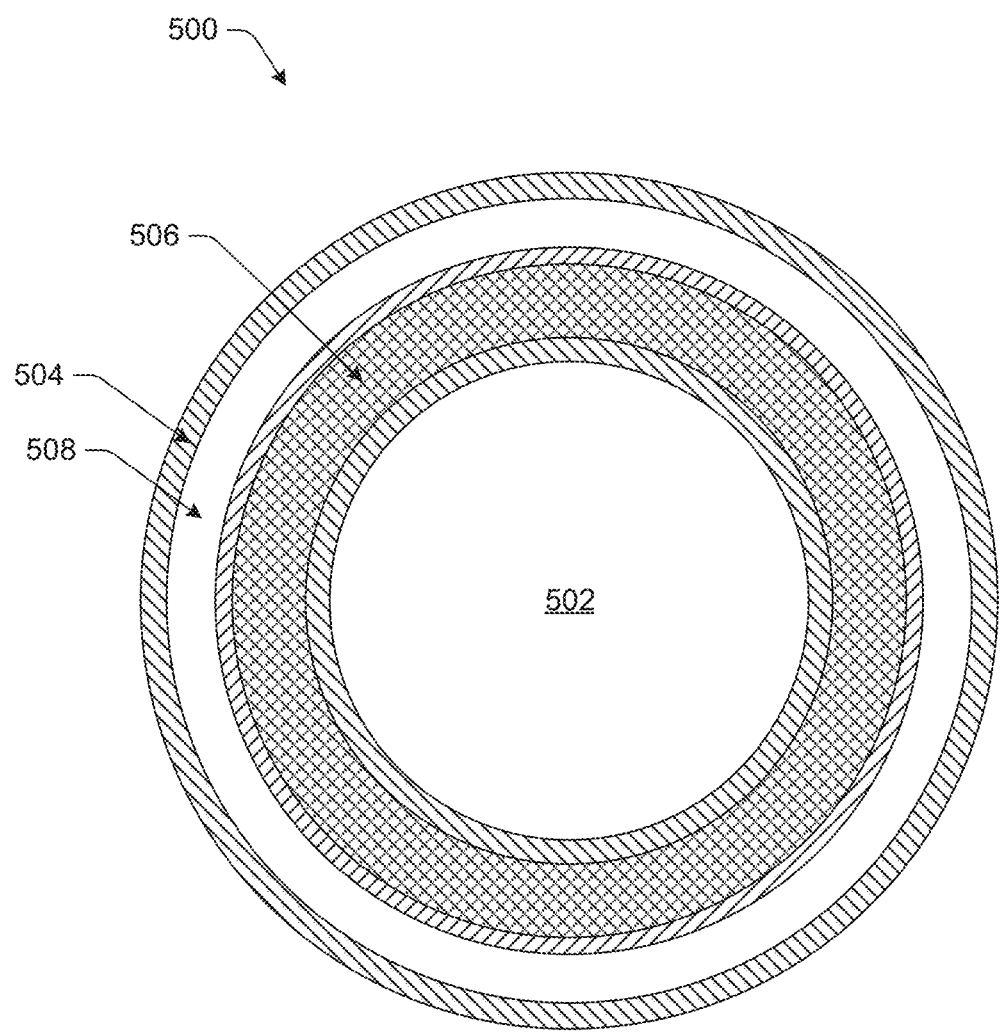
FIG. 5 illustrates a cross-sectional representation of a duplex shell and tube heat exchanger with a porous layer in between the shell and tube, in accordance with some embodiments.

FIG. 5 illustrates a cross sectional view of a duplex tube and shell heat exchanger 500 with a porous layer 506. While the example shows a single tube within a shell, it should be appreciated that any number of tubes may pass through the shell. A hot flow tube 502 provides a flow path for a primary coolant and a cold flow shell 504 is configured to provide a cold flow channel 508 for a secondary coolant. A porous layer 506 may be provided between the hot flow tube 502 and the cold flow shell 504 to provide the advantages described herein. For example, the porous layer 506 provides a double containment barrier to inhibit the mixing of the primary coolant with the secondary coolant; provide flexibility to allow for independent expansion and contraction of the hot flow tube 502 and the cold flow shell 504 in response to thermal stresses caused by the temperature gradient across the heat exchanger 500; and provide a third flow channel for introducing a control gas, such as for controlling the thermal transfer efficiency of the heat exchanger, testing for leakage of the primary coolant and/or secondary coolant, and for removing fission and/or activation products.

In some embodiments, there are structural supports extending between the walls of the hot flow tube 502 and the cold flow shell 504 to provide structural support for the heat exchanger 500. In some cases, the structural supports maintain the desired spacing between the hot flow tube 502 and the cold flow shell 504 to allow the porous layer to be positioned between the hot flow tube 502 and the cold flow shell 504. In some cases, the porous layer 506 may be formed of particulate matter, powder, or other loose structure that can be added to the heat exchanger 500 between the hot flow tube 502 and the cold flow shell 504.

Figure 6:
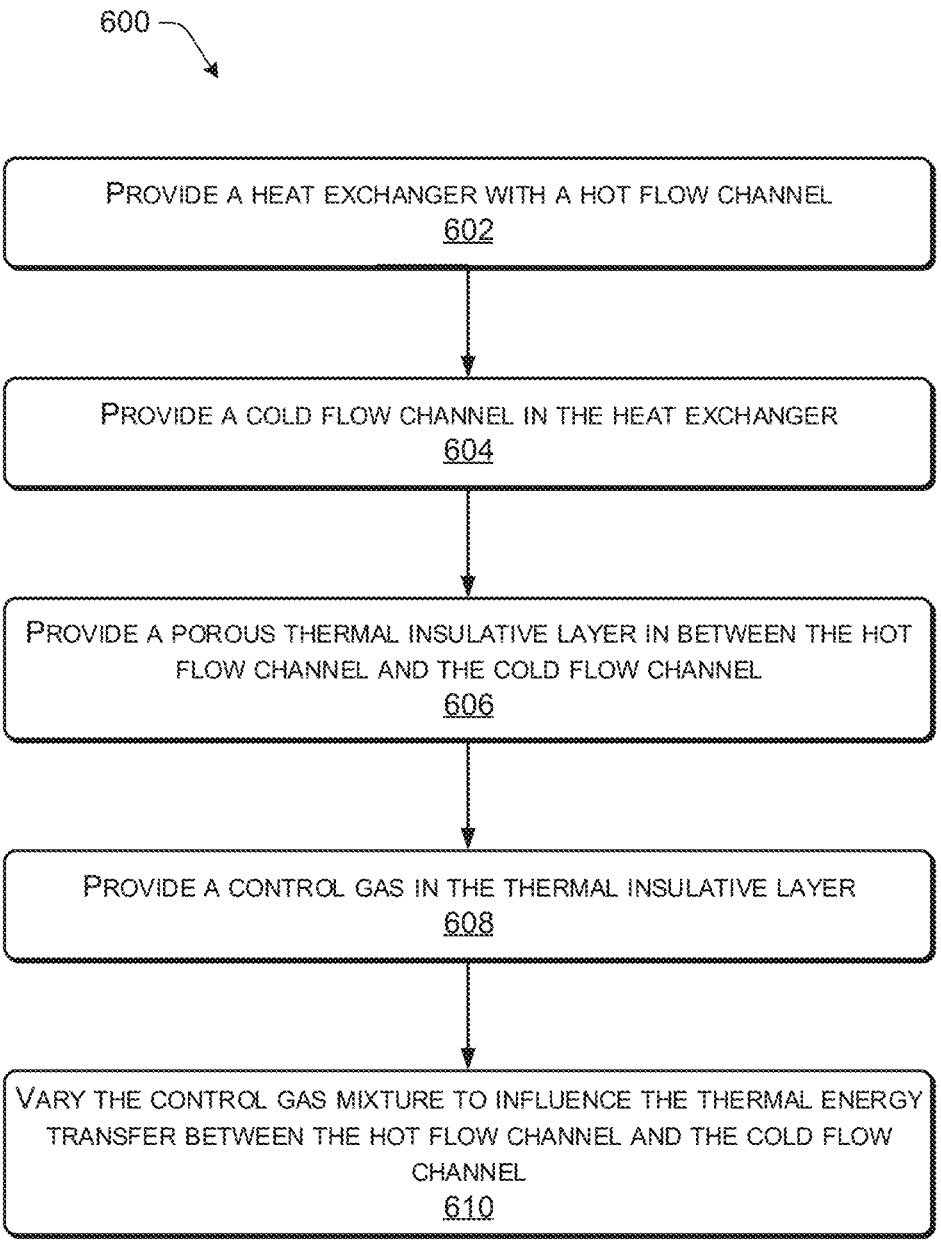
FIG. 6 illustrates a process flow for reducing the thermal transfer efficiency of a heat exchanger, in accordance with some embodiments.

FIG. 6 illustrates an example process for reducing thermal energy transfer efficiency in a heat exchanger. At block 602, a heat exchanger is provided with a hot flow channel, such as for accommodating a primary coolant.

At block 604, the heat exchanger is provided with a cold flow channel, such as for accommodating a secondary coolant, which may be the same or different than the primary coolant.

At block 606, a porous thermal insulative layer is provided in between the hot flow channel and the cold flow channel. The porous thermal insulative layer will provide a gas gap between the hot flow channel and the cold flow channel to provide thermal insulation and to reduce the thermal energy transfer efficiency of the heat exchanger.

Optionally, at block 608, a control gas may be passed through the porous insulative layer. The control gas may be a single gas, or mixture of two or more gases.

Optionally, at block 610, the control gas mixture may be varied to influence the thermal energy transfer efficiency between the hot flow channel and the cold flow channel. For example, where the control gas comprises two gases each having different thermal conductivities, increasing the percentage of one of the gases will decrease the thermal energy transfer efficiency of the heat exchanger, while increasing the percentage of the other gas will increase the thermal energy transfer efficiency of the heat exchanger.

The disclosure sets forth example embodiments and, as such, is not intended to limit the scope of embodiments of the disclosure and the appended claims in any way. Embodiments have been described above with the aid of functional building blocks illustrating the implementation of specified components, functions, and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising." From the foregoing, and the accompanying drawings, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A heat exchanger for a nuclear reactor, comprising:
   a hot flow channel;
   a cold flow channel fluidically separated from the hot flow channel;
   a mixing control; and
   a porous thermally insulative layer disposed between the hot flow channel and the cold flow channel, the porous thermally insulative layer comprising:
   an inlet;
   an outlet; and
   a fluid pathway between the inlet and the outlet; and
   wherein the porous thermally insulative layer is configured to flow a control gas formed by a mixture of two or more gasses through the fluid pathway, and wherein the mixing control is configured to change the mixture of the control gas to vary a thermal energy transfer efficiency of the porous thermally insulative layer.

2. The heat exchanger as in claim 1, wherein the control gas is used for leak detection of a first fluid, a second fluid, or both.

3. The heat exchanger as in claim 1, wherein the control gas is used to capture a fission product or an activation product.

4. The heat exchanger as in claim 3, wherein the control gas captures tritium.

5. The heat exchanger as in claim 1, wherein the control gas comprises argon and helium.

6. The heat exchanger as in claim 1, wherein the porous thermally insulative layer is formed of a metal or metal alloy and defines an open pore structure.

7. The heat exchanger as in claim 1, wherein the porous thermally insulative layer is formed through an additive manufacturing process.

8. The heat exchanger as in claim 1, wherein the porous thermally insulative layer reduces a thermal energy transfer efficiency from the hot flow channel to the cold flow channel.

9. The heat exchanger as in claim 1, wherein the heat exchanger is a plate heat exchanger comprising a hot plate and a cold plate and wherein the hot flow channel is formed as first guide channels in a surface of the hot plate and wherein the cold flow channel is formed as second guide channels in a surface of the cold plate.

10. The heat exchanger as in claim 9, wherein the porous thermally insulative layer is disposed between the hot plate and the cold plate.

11. The heat exchanger as in claim 1, wherein the porous thermally insulative layer decouples the hot flow channel and the cold flow channel and allows the hot flow channel and cold flow channel to react independently to a thermal gradient placed across the heat exchanger.

* * * * *